United States Patent Office.

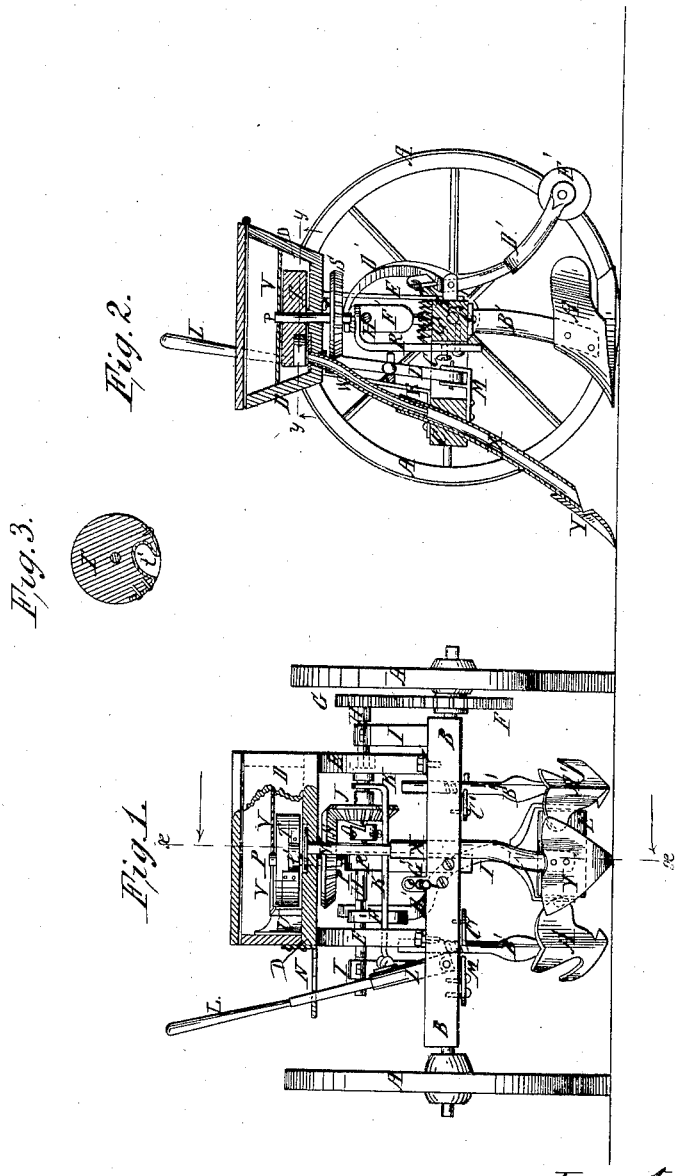

JOSEPH KREBS AND AUGUST JOHNS, OF MASSILLON, OHIO.

Letters Patent No. 69,449, dated October 1, 1867.

IMPROVEMENT IN CORN-PLANTERS.

*The Schedule referred to in these Letters Patent and making part of the same.*

TO ALL WHOM IT MAY CONCERN:

Be it known that we, JOSEPH KREBS and AUGUST JOHNS, of Massillon, in the county of Stark, and State of Ohio, have invented a new and useful Improvement in Corn-Planters; and we do hereby declare that the following is a full, clear, and exact description thereof, which will enable others skilled in the art to make and use the same, reference being had to the accompanying drawings, forming part of this specification, in which—

Figure 1 is a front view of our improved machine, part of the grain-box being broken away to show the dropping device.

Figure 2 is a vertical section of the same taken through the line $x\ x$, fig. 1.

Figure 3 is a detail sectional view of the dropping-wheel taken through the line $y\ y$, fig. 2.

Similar letters of reference indicate corresponding parts.

Our invention has for its object to furnish an improved machine by means of which the ground may be furrowed, the corn dropped and covered, and the hill marked, by the same operation, and which shall at the same time be simple in construction and easily operated; and it consists in the construction, combination, and arrangement of the various parts of the machine, as hereinafter more fully described.

A are the wheels, and B is the axle of the machine, to which is attached the framework C. D is the seed-box, which is supported upon and attached to the upper ends of four bars, E, the lower ends of which are attached to the axle B and frame C. To one of the wheels A is attached a large cog-wheel, F, into the teeth of which mesh the teeth of the small cog-wheel G which is attached to the end of the shaft H. The shaft H revolves in bearings or supports I attached to the axle B, and has a bevel gear-wheel, J, revolving loosely upon it. In the outer end of the hub of the wheel J is formed a groove in which rides the forked end of the connecting-rod K, the other end of which is pivoted to the lever L, the lower end of which is pivoted to an arm or support, M, attached to the frame C, as shown in figs. 1 and 2, and the upper end of which extends up into such a position that it may be reached and operated by the driver. The lever L is held in position, when adjusted, by notches formed in the slotted plate N attached to the end of the seed-box D. Upon the inner end of the hub of the bevel gear-wheel J is formed a clutch which corresponds with the clutch O adjustably attached to the shaft H, so that by moving the said gear-wheel J forward the clutch O may cause it to revolve with the revolution of the shaft H. P is a vertical shaft, the lower end of which revolves in a socket in the support R attached to the axle B, and the upper end of which passes up into the seed-box D. S is a bevel gear-wheel attached to the vertical shaft P in such a position that its teeth may mesh into the teeth of the bevel gear-wheel J when said gear-wheel is moved forward to the clutch O. To the upper end of the vertical shaft P is attached a wheel, T, which revolves within the seed-box D, close to its bottom, and which has an opening or chamber, $t$, formed in the side of its lower part, of such a size as to hold the desired number of kernels for each hill. U is a plate attached to the feed-box D, with its edge near the face of the wheel T, to prevent any grain entering the discharging-spout except that carried in by the chamber $t'$ of the wheel T. V is a horizontal partition placed in the seed-box D to prevent the corn in said seed-box from passing down upon all sides of the wheel T and clogging its motion; one part of said partition being cut away to allow the corn to descend at one side of the wheel T, so as to be carried by the chamber $t'$ to the discharging-spout W, the upper end of which is connected with the discharging-orifice in the bottom of the seed-box D, and the lower end of which is connected with the hollow standard X of the shovel-plough Y which opens the furrow for the reception of the seed, so as to drop the seed in said furrow close to the rear side of said plough. The standard X is securely attached to the frame C. A' are the covering-ploughs, the standards B' of which are adjustably secured to the axle B, in the rear and at each side of the standard X, by the catch-plate C' pivoted to the axle B, and the edge of which enters one or the other of the notches or grooves formed in the said standards B', so as to hold the ploughs A' at any desired elevation. D' is a lever which is pivoted to the rear side of the axle B, to the forked lower end of which is pivoted a roller, E'. The upper end of the lever D' extends up into such a position that it may be operated by the cam F' attached to or formed upon the shaft H, said cam being so adjusted as to operate the lever D' and bring the roller E' in contact with the ground at the spot where the corn has been planted, thus marking the hill. G' is a coiled or equivalent spring, one end of which is attached to the upper part of the lever D', and the other end to the axle B or to some other convenient support, so as to raise the roller E' away from the ground as soon as the lever D' has been released from the cam F'.

We claim as new, and desire to secure by Letters Patent—

An improved corn-planter, formed by the combination of the marking-plough Y, adjustable covering-ploughs A', roller E', lever D', and dropping-wheel T, with each other, said parts being constructed, arranged, and operated substantially as herein shown and described and for the purpose set forth.

JOSEPH KREBS,
AUGUST JOHNS.

Witnesses:
ALOUES G. SEABOLD,
JOHN KRAFT.